United States Patent [19]

Chancellor

[11] Patent Number: 5,545,411

[45] Date of Patent: Aug. 13, 1996

[54] METHOD FOR LOWERING VISCOSITY BY USE OF GUM ACACIA

[75] Inventor: Cindy L. Chancellor, Evansville, Ind.

[73] Assignee: Bristol-Myers Squibb Company, Princeton, N.J.

[21] Appl. No.: 356,996

[22] Filed: Dec. 16, 1994

[51] Int. Cl.⁶ .................................................. A61K 47/26
[52] U.S. Cl. ...................... 424/439; 424/195.1; 426/590; 514/904; 514/905
[58] Field of Search .................................. 424/195.1, 439; 426/590; 514/904, 905

[56] References Cited

U.S. PATENT DOCUMENTS

| | | | |
|---|---|---|---|
| 4,698,232 | 10/1987 | Sheu et al. | 426/572 |
| 4,747,881 | 5/1988 | Shaw et al. | 106/209 |
| 4,834,990 | 5/1989 | Amer | 426/74 |
| 4,957,764 | 9/1990 | Okonogi et al. | 426/573 |
| 4,988,530 | 1/1991 | Hoersten et al. | 426/577 |
| 5,085,883 | 2/1992 | Garleb et al. | 426/590 |
| 5,104,676 | 4/1992 | Mahmoud et al. | 426/590 |
| 5,104,677 | 4/1992 | Behr et al. | 426/590 |
| 5,126,143 | 6/1992 | Nakashima et al. | 424/439 |
| 5,230,918 | 7/1993 | Anderson et al. | 426/572 |

OTHER PUBLICATIONS

B. J. Kelly et al., Journal of Food Science, vol. 55, No. 5, 1990, pp. 1004–1007.
O. Osilesi et al., American Institute of Nutrition, pp. 462–468, 1987.
W. L. Haskell et al., The American Journal of Cardiology, vol. 69, No. 5, pp. 433–439, 1992.
I. T. Johnson et al., American Journal of Clinical Nutrition, vol. 47, pp. 1004–1009, 1988.
C. D. Jensen et al., Journal of the American College of Nutrition, vol. 12, No. 2, pp. 147–154, 1993.

*Primary Examiner*—Thurman K. Page
*Assistant Examiner*—Sharon Howard
*Attorney, Agent, or Firm*—Thomas R. Savitsky

[57] ABSTRACT

Method for lowering viscosity in nutritional compositions containing soy fiber by addition of gum acacia. The composition is preferably nutritionally complete and optionally contains protein, non-fiber carbohydrate, and other nutrients.

11 Claims, No Drawings

METHOD FOR LOWERING VISCOSITY BY USE OF GUM ACACIA

FIELD OF THE INVENTION

The present invention concerns lowering the viscosity of an aqueous nutritional product containing soy fiber by use of gum acacia.

BACKGROUND OF THE INVENTION

The use of dietary fiber recently has been linked to promotion of good health, for example, ingestion of fiber has been reported to have beneficial effects on weight control, cholesterol levels, diabetes, prevention of cardiovascular disease, prevention of colon cancer, and the like. Dietary fiber is defined as carbohydrate material, typically of plant origin, which is resistant to hydrolysis by enzymes of the mammalian digestive tract. A popular dietary fiber for use in nutritional products is soy fiber. Soy fiber is an insoluble fiber that has many beneficial properties; however, it substantially increases the viscosity of aqueous products which can present difficulties in formulation and administration. For example, soy fiber when used in tube feeding nutritional products can cause a viscosity increase to the extent such that undesirably low flow rates can occur, or the tubes can even clog in extreme situations.

Gum acacia, also know as gum arabic, is a soluble fiber which also has been used in aqueous nutritional products. It's primary application is an emulsifier in beverages and for flavor encapsulation. Gum acacia has also been used in the beverage industry as a source of soluble fiber. Gum acacia, although not known to be one of the more viscous fibers, is known for its thickening or viscosity building properties.

Although soy fiber and gum acacia have been used in nutritional products (see, for example, U.S. Pat. No. 4,988,530 and 5,104,677), both types of fibers are taught in the art to add to, or build, viscosity.

It has been surprisingly discovered, as described in detail hereinafter, that use of gum acacia in aqueous nutritional products containing soy fiber actually lowers the viscosity of the products.

SUMMARY OF THE INVENTION

The present invention is directed to a method for lowering the viscosity of an aqueous nutritional composition containing soy fiber comprising adding to said nutritional composition an effective viscosity lowering amount of gum acacia.

The present invention encompasses aqueous nutritional compositions of lowered viscosity that contain soy fiber and gum acacia. Thus, the present invention is also directed to a nutritional composition comprising (a) about 0.2 to 3 weight % soy fiber, (b) 0 to 8 weight % protein, (c) 0 to 17 weight % non-fiber carbohydrate, (d) about 60 to 98 weight % water, and (e) an effective viscosity lowering amount of gum acacia.

DETAILED DESCRIPTION OF THE INVENTION

It has been surprisingly discovered that adding gum acacia to an aqueous nutritional product containing soy fiber will lower the viscosity of the product rather then increase the viscosity. Lower viscosity of aqueous nutritional compositions can be very important when the product must be administered through a small opening or tube such as with tube feeding, for example, to achieve adequate flow rates Lower viscosity also facilitate processing and packaging of the product. Also, lower viscosity can also provide increased palatability.

The effective viscosity lowering amount of gum acacia is about 0.2 to about 4, preferably about 0.5 to about 3, and more preferably about 1 to about 2 weight % of total composition. The amount of viscosity decrease achieved is typically about 5 to about 40 %, preferably about 10 to about 30%, and more preferably about 20 to about 30%. The aqueous nutritional composition of the invention contains a substantial amount of soy fiber, typically about 0.2 to about 3, preferably about 0.8 to about 2.5, and more preferably about 1 to about 2 weight % of total composition. Other fibers are optionally present such as pectin; oat hull fiber; pea fiber; cellulose or derivatives thereof, such as carboxymethyl cellulose; other gums such as guar gum, xanthan gum; and the like.

The nutritional composition of the invention preferably contains protein and/or non-fiber carbohydrates. A preferred composition of the invention comprises:

(a) about 0.2 to about 3 weight % soy fiber;

(b) 0 to about 8 weight % protein;

(c) 0 to about 17 weight % non-fiber carbohydrate;

(d) about 60 to about 98 weight % water; and (e) an effective viscosity lowering amount of gum acacia.

A more preferred composition comprises:

(a) about 0.8 to 2.5 weight % soy fiber, (b) about 2 to 8 weight % protein, (c) about 1 to 17 weight % non-fiber carbohydrate, (d) about 63 to 84 weight % water, and (e) an effective viscosity lowering amount of gum acacia.

An even more preferred composition comprises:

(a) about 1 to 2 weight % soy fiber, (b) about 3 to 6 weight % protein, (c) about 12 to 15 weight % non-fiber carbohydrate, (d) about 69 to 81 weight % water, and (e) an effective viscosity lowering amount of gum acacia.

If lipid (fat)is present, the amount of lipid is typically about 1.5 to about 10, preferably about 2 to about 6, and more preferably about 2.4 to about 4.5 weight % of composition.

The composition of the invention is preferably nutritionally complete; however, nutritional supplements, beverages, and the like are also contemplated. By the term "nutritionally complete" is meant that the composition contains adequate nutrients to sustain healthy human life for extended periods. The composition can be cow milk-based, soy-based, or based on other nutrients. The caloric density of the nutritionally complete composition of the invention contains from 15 to 60 calories per fluid ounce in a ready-to-feed form. The nutritional composition of the invention can be an infant formula or an adult enteral composition that is administered via the normal oral route or via tube feeding.

The composition of the invention contains ingredients which are designed to meet the nutritional needs of mammals, especially humans, such as a protein (amino acid) source, a lipid source, and a carbohydrate source. Typically milk, skim milk, casein, hydrolyzed whey protein, whey, vegetable protein concentrate (e.g., soy protein isolate), hydrolyzed vegetable protein (e.g., hydrolyzed soy protein), animal oils, vegetable oils, starch, sucrose, lactose and/or corn syrup solids will be added to the composition to supply part of all of the amino acids and/or protein, lipid, and carbohydrate as well as other nutrients such as vitamins and minerals.

The non-fiber carbohydrate component of the composition of the invention, if present, can be any suitable carbohydrate known in the art to be suitable for use in nutritional compositions. Typical carbohydrates include sucrose, fructose, xylitol, glucose, maltodextrin, lactose, corn syrup, corn syrup solids, rice syrup solids, rice starch, modified corn starch, modified tapioca starch, rice flour, soy flour, and the like.

If lipid is present it can be any lipid or fat known in the art to be suitable for use in nutritional compositions. Typical lipid sources include milk fat, safflower oil, canola oil, egg yolk lipid, olive oil, cotton seed oil, coconut oil, palm oil, palm kernel oil, soybean oil, sunflower oil, fish oil and fractions of all above oils derived thereof such as palm olein, medium chain triglycerides (MCT), and esters of fatty acids wherein the fatty acids are, for example, arachidonic acid, eicosapentaenoic acid, linolenic acid, oleic acid, lauric acid, capric acid, caprylic acid, caproic acid, and the like. High oleic forms of various oils are also contemplated to be useful herein such as high oleic sunflower oil and high oleic safflower oil.

If protein is present it can be any protein and/or amino acid mixture known in the art to be suitable for use in nutritional compositions. Typical protein sources are animal protein; vegetable protein such as soy protein; milk protein such as skim milk protein, whey protein, casein, and milk protein concentrates; and amino acids (or salts thereof) such as isoleucine, phenylalanine, leucine, lysine, methionine, theonine, tryptophan, arginine, glutamine, taurine, valine, and the like. Preferred protein sources are whey protein, sodium caseinate, calcium caseinate, or milk protein concentrates; optionally supplemented with amino acids. For some applications a preferred protein source is hydrolyzed protein (protein hydrolysate) optionally supplemented with amino acids.

The protein hydrolysate useful in the invention may be any suitable protein hydrolysate utilized in a nutritional formula such as soy protein hydrolysate, casein hydrolysate, whey protein hydrolysate, other animal and vegetable protein hydrolysates, and mixtures thereof. The protein hydrolysate of the composition of the invention is preferably a soy protein, whey protein, or a casein hydrolysate comprising shod peptides and amino acids, optionally supplemented with additional amino acids. In a preferred embodiment, the protein hydrolysate useful in the invention contains a high percentage of free amino acids (e.g., greater than 40%) and low molecular weight peptide fragments.

The hydrolyzed protein of the composition of the invention is also preferably supplemented with various free amino acids to provide a nutritionally balanced amino content. Examples of such free amino acids include L-tryptophan, L-methionine, L-cystine, L-tyrosine, and L-arginine.

Nutritionally complete compositions contain all vitamins and minerals understood to be essential in the daily diet and these should be present in nutritionally significant amounts. Those skilled in the art appreciate that minimum requirement have been established for certain vitamins and minerals that are known to be necessary for normal physiological function. Practitioners also understand that appropriate additional amounts (overages) of vitamin and mineral ingredients need to be provided to compensate for some loss during processing and storage of such compositions. The composition of the invention preferably contains at least 100% of the U.S. Recommended Daily Allowance (RDA) in 500 to 4000 calories (cal) of composition, preferably to 600 to 3000 cal of composition.

To select a specific vitamin or mineral compound to be used in the composition requires; consideration of that compound's chemical nature regarding compatibility with the other ingredients, processing conditions, and shelf storage.

Examples of minerals, vitamins, and other nutrients optionally present in the infant formula of the invention include vitamin A, vitamin $B_6$ vitamin $B_{12}$, vitamin E, vitamin K, vitamin C, vitamin D, inositol, taurine, folic acid, thaimine, riboflavin, niacin, biotin, panthothenic acid, choline, calcium, phosphorous, iodine, iron, magnesium, copper, zinc, manganese, chloride potassium, sodium, beta-carotene, nucleotides, selenium, chromium, molybdenum, and L-carnitine. Minerals are usually added in salt form. In addition to compatibility and stability considerations, the presence and amounts of specific minerals and other vitamins will vary somewhat depending on the intended consumer population.

The composition of the invention also typically contains emulsifiers and/or stabilizers such as lecithin, (e.g., egg or soy), carageenan, xanthan gum, mono- and diglycerides, guar gum, carboxymethyl cellulose, stearoyl lactylates, succinylated monoglycerides, diacetyl tartaric acid esters of monoglycerides, polyglycerol esters of fatty acids, or any mixture thereof.

The composition of the invention can be prepared by use of standard techniques known in the nutritional art, for example by techniques analogous to those disclosed in U.S. Pat. Nos. 4,670,268; 4,497,800; 4,921,877; 5,104,677; and 5,223,285, the disclosures of which are incorporated herein by reference in their entirety, or by the techniques taught herein.

The composition of the invention can be sterilized, if desired, by technique known in the art, for example, heat treatment such as autoclaving or retorting, irradiation, and the like, or processed and packaged by aseptic technology.

The composition of the invention can be packaged in any type of container known in the art to be useful for storing nutritional products such as glass, lined paperboard, plastic, coated metal cans and the like.

The composition of the invention can also contain flavorants to increase palatability such as vanilla, chocolate, fruit flavor such as cherry, orange, strawberry, and the like.

The following examples are to illustrate the invention but should not be interpreted as a limitation thereon. Percentages are by weight unless indicated otherwise.

EXAMPLE 1

A nutritionally complete, general tube-feeding nutritional composition within the scope of the invention is as follows:

|  | 100 mL |
|---|---|
| Calories | 106 |
| Protein, g | 4.4 |
| Fat, g | 4.5 |
| Carbohydrate, g | 12.3 |
| Dietary Fiber*, g | 1.44 |
| Water, g | 85 |
| Vitamin A, IU | 420 |
| Vitamin D, IU | 34 |
| Vitamin E, IU | 6.3 |
| Vitamin K. μg | 10.6 |
| Vitamin C, mg | 25 |

|  | 100 mL |
| --- | --- |
| Folic Acid, μg | 34 |
| Thiamine, mg | 0.32 |
| Riboflavin, mg | 0.36 |
| Niacin, mg | 4.2 |
| Vitamin $B_6$, mg | 0.42 |
| Vitamin $B_{12}$, μg | 1.27 |
| Biotin, μg | 25 |
| Pantothenic Acid, mg | 2.1 |
| Choline, mg | 42 |
| Calcium, mg | 85 |
| Phosphorus, mg | 85 |
| Iodine, μg | 12.7 |
| Iron, mg | 1.52 |
| Magnesium, mg | 34 |
| Copper, mg | 0.17 |
| Zinc, mg | 1.69 |
| Manganese, mg | 0.25 |
| Chloride, mg | 144 (4.1 mEq) |
| Potassium, mg | 161 (4.1 mEq) |
| Sodium, mg | 93 (4 mEq) |
| Selenium, μg | 8.5 |
| Chromium, μg | 8.5 |
| Molybdenum, μg | 21 |
| Taurine, μg | 12.7 |
| L-carnitine, mg | 19 |

*Dietary fiber is 25 to 75 weight % soy fiber and 25 to 75 weight % gum acacia.

EXAMPLE 2

Another nutritionally complete tube-feeding composition within the scope of the invention is as follows:

|  | 100 mL |
| --- | --- |
| Calories | 106 |
| Protein, g | 4.6 |
| Fat, g | 3.5 |
| Carbohydrate, g | 14 |
| Dietary Fiber*, g | 0.59 |
| Water, g | 84 |
| Vitamin A, IU | 350 |
| Vitamin D, IU | 42 |
| Vitamin E, IU | 2.1 |
| Vitamin K, μg | 9.7 |
| Vitamin C, mg | 12.7 |
| Folic Acid, μg | 42 |
| Thiamine, mg | 0.16 |
| Riboflavin, mg | 0.18 |
| Niacin, mg | 2.1 |
| Vitamin $B_6$, mg | 0.21 |
| Vitamin $B_{12}$, μg | 0.63 |
| Biotin, μg | 32 |
| Pantothenic Acid, mg | 1.06 |
| Calcium, mg | 84 |
| Phosphorus, mg | 70 |
| Iodine, μg | 10.5 |
| Iron, mg | 1.27 |
| Magnesium, mg | 28 |
| Copper, mg | 0.14 |
| Zinc, mg | 1.39 |
| Manganese, mg | 0.18 |
| Chloride, mg | 139 (3.9 mEq) |
| Potassium, mg | 139 (3.6 mEq) |
| Sodium, mg | 72 (3.1 mEq) |

*Dietary fiber is 25 to 75 weight % soy fiber and 25 to 25 weight % gum acacia.

EXAMPLE 3

Preparation of a composition substantially as described in Example 1 is as follows.

1. Prepare a calcium/sodium casienate slurry.

To a container with good agitation add water and casein in a 90/10 ratio. Add calcium hydroxide as a 10% solution in water to the casein slurry. Add sodium hydroxide as a 10% solution in water.

If the pH is below 6.9 adjust the pH of the casein slurry to 7.0 (6.9–7.2) by the addition of potassium hydroxide.

2. Maintaining a temperature of 140 degrees F. (130–150) dissolve/suspend the following ingredients:

Calcium Phosphate Tribasic

Calcium Citrate

Magnesium Phosphate Dibasic

Potassium Citrate

Potassium Chloride

Choline Chloride

L-Carnitine

Ferrous Sulfate

Trace Mineral Premix

Continue agitation and blend with protein slurry from step 1.

3. Incorporate the following ingredients together in an appropriate mixing vessel:

Soy Fiber

Gum Acacia

Malto-Dextrin

Add to the Protein/Mineral slurry from step 2.

4. Add the following ingredients to make an oil blend:

Soy Oil

MCT Oil

Mono-Diglycerides

Lecithin

Vitamins ADE&K Concentrate

Carrageenan

Add this mixture to the Protein/Mineral/Fiber slurry from step 3.

5. Pump the product from step 4 through a direct steam injection unit at 285° F. for 45 seconds. Cool immediately to 160° F. Measure pH, total solids and viscosity.

6. Homogenize at 500 psig 2nd stage and 2500 psig 1st stage for a total of 3000 psig. Repeat the homogenization and cool 35°–50° F.

7. Adjust solids to a target of 22.45% total solids (TS) (21.2%–24.55%).

EXAMPLE 4

Viscosity of the compositions of the invention are determined as follows:

Material

A. Brookfield Syncho-Lectric Viscometer, Model LVF using Spindle No. 1, variable rpm speed and the 100 scale, with spindle guard or the equivalent.

B. UK LTD Viscometer, Model LV8 using Spindle No. 1, variable rpm speed and the 100 scale, with the spindle guard or the equivalent.

Procedure

Adjust temperature of sample to 30° C. (86° F.) (or at temperature specified) by placing container of sample in a suitable water bath. Stir sample carefully with a thermometer avoiding entrapment of air.

Use viscometer spindle No. 1,30 rpm speed and the 100 scale. Place spindle in sample to depth marked on spindle and level viscometer (spindle must rotate freely). If reading is off scale, see factor table to determine an alternate speed and corresponding factor.

Start viscometer and take reading when value has not changed in 3 revolutions. Record reading of 100 scale.

Calculations

Calculations for (A)

| Speed (RPM) | Factor (F) |
| --- | --- |
| .3 | 200 |
| .6 | 100 |
| 1.5 | 40 |
| 3. | 20 |
| 6. | 10 |
| 12. | 5 |
| 30. | 2 |

Calculations for (B) Record the viscosity reading which is displayed in units of centipoise.

EXAMPLE 5

Five products were formulated as described in Example 1 except that the dietary filber component was varied. The results are in the following table;

| Sample Number | Variable | Viscosity (cps) |
| --- | --- | --- |
| 1 | No fiber, no additional solids | 12.0 |
| 2 | No fiber, balanced solids w/ maltodextrin | 15.0 |
| 3 | Soy fiber, 1.7 g/8 fl. oz | 32.0 |
| 4 | Soy fiber and gum acacia both at 1.7 g/8 fl. oz | 24.0 |
| 5 | Gum acacia, 1.7 g/8 fl. oz | 12.0 |

EXAMPLE 6

Additional studies were completed to evaluate the effect of gum acacia on lowering viscosity in a system with carbohydrate 10 and protein alone.

| Formulation | 1 | 2 |
| --- | --- | --- |
| Gum Acacia | 66.62 g | 0 g |
| Soy Fiber | 98.40 g | 98.40 g |
| Maltodextrin | 1634.67 g | 1634.67 g |
| Final Viscosity (Avg. of 4 samples) | 16.5 g | 18.0 g |

Mixtures were processed at the same solids (22.45%) and pH with the same leel of carbohydrate and soy fiber. Mixture 1 contained gum acacia. The Mixture with gum acacia had a lower viscosity than the mixture with soy fiber alone.

| Formulation | 1 | 2 |
| --- | --- | --- |
| Gum Acacia | 0% | 0.54% |
| Calcium Caseinate | 2.34% | 2.34% |
| Sodium Caseinate | 2.29% | 2.29% |
| Final Viscosity | 45.4 cps. | 32.0 cps |

Mixtures at the same solids (10%) and pH containing the same % of protein and soy fiber were processed. Mixture 2 contained gum acacia. The mixture with gum acacia had a lower viscosity than the mixture with soy fiber alone.

What is claimed is:

1. A nutritional composition comprising:
   (a) about 0.2 to about 3 weight % soy fiber;
   (b) 0 to about 8 weight % protein,
   (c) 0 to about 17 weight % non-fiber, carbohydrate;
   (d) about 60 to about 98 weight % water, and
   (e) an effective viscosity lowering amount of gum acacia.

2. The composition of claim 1 comprising:
   (a) about 0.8 to about 2.5 weight % soy fiber;
   (b) about 2 to about 8 weight % protein,
   (c) about 10 to about 17 weight % non-fiber, carbohydrate;
   (d) about 63 to about 84 weight % water, and
   (e) an effective viscosity lowering amount of gum acacia.

3. The composition of claim 1 comprising:
   (a) about 1 to about 2 weight % soy fiber;
   (b) about 3 to about 6 weight % protein,
   (c) about 12 to about 15 weight % non-fiber, carbohydrate;
   (d) about 69 to about 81 weight % water, and
   (e) an effective viscosity lowering amount of gum acacia.

4. The composition of claim 1 wherein said viscosity lowering amount of gum acacia is about 0.2 to about 4 weight %.

5. The composition of claim 1 wherein said viscosity lowering amount of gum acacia is about 0.5 to about 3 weight %.

6. The composition of claim 1 wherein said viscosity lowering amount of gum acacia is about 1 to about 2 weight %.

7. The composition of claim 2 further comprising about 1.5 to about 10 weight % lipid.

8. The composition of claim 3 further comprising about 2 to about 6 weight % lipid.

9. The composition of claim 7 further comprising vitamins and minerals.

10. The composition of claim 8 further comprising vitamins and minerals.

11. The composition of claim 10 which is nutritionally complete.

* * * * *